United States Patent
Ahn et al.

[11] Patent Number: 6,160,905
[45] Date of Patent: Dec. 12, 2000

[54] MATERIAL LOADER APPARATUS AND METHOD USING A SINGLE IMAGE RECOGNITION DEVICE FOR BAR CODE AND VISION MARK RECOGNITION

[75] Inventors: Chung-sam Ahn; Kwon-su Park, both of Seoul, Rep. of Korea

[73] Assignee: Samsung Electronics Co., Ltd., Suwon, Rep. of Korea

[21] Appl. No.: 09/135,554

[22] Filed: Aug. 18, 1998

[30] Foreign Application Priority Data

Dec. 26, 1997 [KR] Rep. of Korea ................. 97-74012

[51] Int. Cl.⁷ ........................................... G06K 9/00
[52] U.S. Cl. .......................... 382/141; 382/153; 901/1; 700/245; 348/86
[58] Field of Search ...................... 382/141, 143, 382/144, 145, 147, 151, 152, 153; 250/310, 548; 29/705; 901/1, 46, 47; 348/86–87, 91–92, 94–95; 209/509; 700/112–116, 214–215, 245, 264

[56] References Cited

U.S. PATENT DOCUMENTS 5,515,599  5/1996  Best ........................................ 29/705

OTHER PUBLICATIONS

Kim et al. "Sensor–based navigation control and calibration of a wafer–handling mobile robot." Industry Applications Conference, 1995, IEEE. v. 3, Oct. 1995. pp. 1922–1929.

*Primary Examiner*—Bhavesh Mehta
*Attorney, Agent, or Firm*—Jones Volentine, LLC

[57] ABSTRACT

An apparatus for transferring a wafer carrier is capable of recognizing both a bar code of the wafer carrier and a vision mark for position correction attached to a processing equipment. It is possible to recognize both the bar code and the vision mark using a single image recognition device, by determining a required focal length for a lens in the image recognition device, and by determining the required size of the vision mark. Therefore, a separate bar code reader to recognize the bar code is not required in the processing equipment. This results in a reduced cost and increased productivity, since the processing equipment need not to be shut down for installation of a bar code reader.

15 Claims, 4 Drawing Sheets

MATERIAL LOADER APPARATUS AND METHOD USING A SINGLE IMAGE RECOGNITION DEVICE FOR BAR CODE AND VISION MARK RECOGNITION

BACKGROUND OF THE INVENTION

1. Field of the Invention

The present invention relates to an apparatus and a method for transferring a material loader such as a wafer carrier. More particularly, the present invention relates to a material loader transferring apparatus having an image recognition device capable of recognizing both a vision mark for correcting the position of a robot arm and a bar code of a material loader to be transferred, instead of having a separate device for bar code recognition. The present invention also relates to a method for transferring the material loader using the material loader transferring apparatus.

2. Background of the Related Art

Generally, a semiconductor fabrication line includes operation areas such as bays, rooms and the like organized for efficiency of operation. For example, predetermined processes are carried out in semiconductor fabrication equipment installed in the bays. Wafer carriers have generally been transferred from bay to bay by operators. However, the semiconductor chips contained in the wafer carriers may be contaminated during the transfer, by particles generated by the operators. Therefore, automated wafer carrier transfer has been developed to minimize such contamination. Automated wafer carrier transfer is carried out in such a manner that the wafer carrier is removed from a stocker and transferred to the relevant equipment by a wafer carrier transferring apparatus.

More particularly, when the wafer carrier is removed from the stocker, an identifying bar code is attached to the wafer carrier. A bar code recognition device reads the bar code and transmits the information into a host computer. The host computer transmits the information to the relevant equipment.

Thereafter, the wafer carrier is loaded onto the wafer carrier transferring apparatus. The wafer carrier transferring apparatus is moved along a preset conveying line. When the wafer carrier transferring apparatus arrives in front of the relevant equipment, an image recognition device installed in the wafer carrier transferring apparatus recognizes a vision mark for position correction attached to the equipment, the position of a robot arm is corrected and the wafer carrier is loaded onto the equipment by the robot arm. The equipment then checks the identifying information of the wafer carrier which was transmitted from the host computer and performs the relevant process.

However, such a method for transferring the wafer carrier suffers from an operation failure caused when the identifying information of the wafer carrier cannot be checked because the wafer carrier is accidently loaded onto an incorrect process equipment due to system error.

To overcome this disadvantage, a bar code recognition device for reading the bar code on the wafer carrier has been provided in the process equipment. When the bar code recognition device installed in the process equipment reads the bar code on the wafer carrier loaded on a loader of the process equipment, the bar code identifying information is inputted into a controlling portion of the process equipment. The controlling portion checks whether or not the inputted bar code information is the same as the bar code information transmitted from the host computer. If the inputted bar code information is the same as the bar code information transmitted from the host computer, the process is carried out.

However, installation of bar code recognition devices into each piece of process equipment is costly. Moreover, operation of the process equipment must be stopped in order to install the bar code recognition device therein, so productivity suffers.

SUMMARY OF THE INVENTION

It is therefore an object of the present invention to provide an image recognition unit instead of the bar code recognition device, the image recognition device being capable of recognizing both a vision mark for correcting the position of a robot arm and a bar code of a wafer carrier. Using such an image recognition device, installation of the additional bar code recognition device is unnecessary.

According to an aspect of the present invention, an apparatus for transferring a material loader includes a support onto which the material loader is loaded. A robot arm is provided for unloading the material loader from the support and loading the unloaded material loader onto a processing equipment, or unloading the material loader from the processing equipment and loading the unloaded material loader onto the support. A conveying unit supports and moves the support and the robot arm. An image recognition unit installed in the robot arm recognizes both a bar code attached to the material loader and a vision mark for correcting the position of the robot arm, the vision mark being installed in the equipment.

Preferably, the image recognizing unit may be a CCD camera. The CCD camera includes a lens having a focal length that allows the camera to focus on the bar code and the vision mark. A CCD sensor outputs an image signal corresponding to the amount of light incident from the lens. The CCD sensor is installed in a housing to which the lens is detachably coupled.

As an embodiment of the present invention, the lens has a focal length of 25 mm and the vision mark has a width of 52 mm, and at an operation distance of 250 mm the lens has a field of view of 52 mm.

Selectively, the CCD camera may further comprise an extension ring coupled with the lens so that the effective focal length of the lens can be more minutely controlled. The dimensions of the extension ring are selected so as to increase the effective focal length of the lens by 3 mm when the extension ring is; used with the 25 mmf lens. Thereby the lens with the extension ring, at an operation distance of 250 mm, has a field of view of 66 mm, and at an operation distance of 200 mm, has a field of view of 55 mm.

It is also an object of the present invention to provide a method for transferring a wafer carrier, includes the steps of: reading bar code information from the bar code on the wafer carrier and transmitting the bar code information to a host computer; moving the wafer carrier to a relevant processing equipment; reading the bar code information from the bar code a second time and transmitting the bar code information to the host computer; determining whether or not the bar code information read the first time is the same as the bar code information read the second time; if it is determined that the first and second readings of the bar code information are the same, recognizing a vision mark for position correction located on the processing equipment to correct a loading position of the wafer carrier; and loading the wafer carrier onto the processing equipment at the corrected position.

The first reading of the bar code information is performed by a bar code reader, and both the second reading of the bar code information and the recognition of the vision mark are performed by an image recognition device.

The moving of the wafer carrier to the relevant processing equipment is performed by a wafer carrier transferring apparatus, and the image recognition device is located on the wafer carrier transferring apparatus.

The image recognition device is a CCD camera, and the step of recognizing the vision mark is performed by positioning the CCD camera a predetermined distance from the vision mark, detecting actual coordinate values of the vision mark, and calculating an error value by comparing the detected actual coordinate values with reference values, wherein the predetermined distance is 250 mm, a lens of the CCD camera has a focal length of 25 mm, and the vision mark has a width of 52 mm.

According to a preferred aspect of the present invention, an apparatus for transferring a wafer carrier includes: a support onto which the wafer carrier is loaded; a robot arm for unloading the wafer carrier from the support and loading the unloaded wafer carrier onto a processing equipment, and unloading the wafer carrier from the processing equipment and loading the unloaded wafer carrier onto the support; a conveying unit for supporting and moving the support and the robot arm; and a CCD camera installed in the robot arm, for recognizing both a bar code attached to the wafer carrier and a vision mark for correcting the position of the robot arm, the vision mark being attached to the processing equipment. The CCD camera includes: a lens having a focal length that allows the camera to focus on the bar code and the vision mark; a CCD sensor for outputting an image signal corresponding to the amount of light incident from the lens; and a housing to which the lens is detachably coupled and in which the CCD sensor is installed. The lens has a focal length of 25 mm and the vision mark has a width of 52 mm, such that at an operation distance of 250 mm the lens has a field of view of 52 mm.

BRIEF DESCRIPTION OF THE ATTACHED DRAWINGS

The accompanying drawings illustrate embodiments of the invention, in which.

DETAILED DESCRIPTION OF PREFERRED EMBODIMENTS

The present invention now will be described more fully hereinafter with reference to the accompanying drawings.

Figure 1:
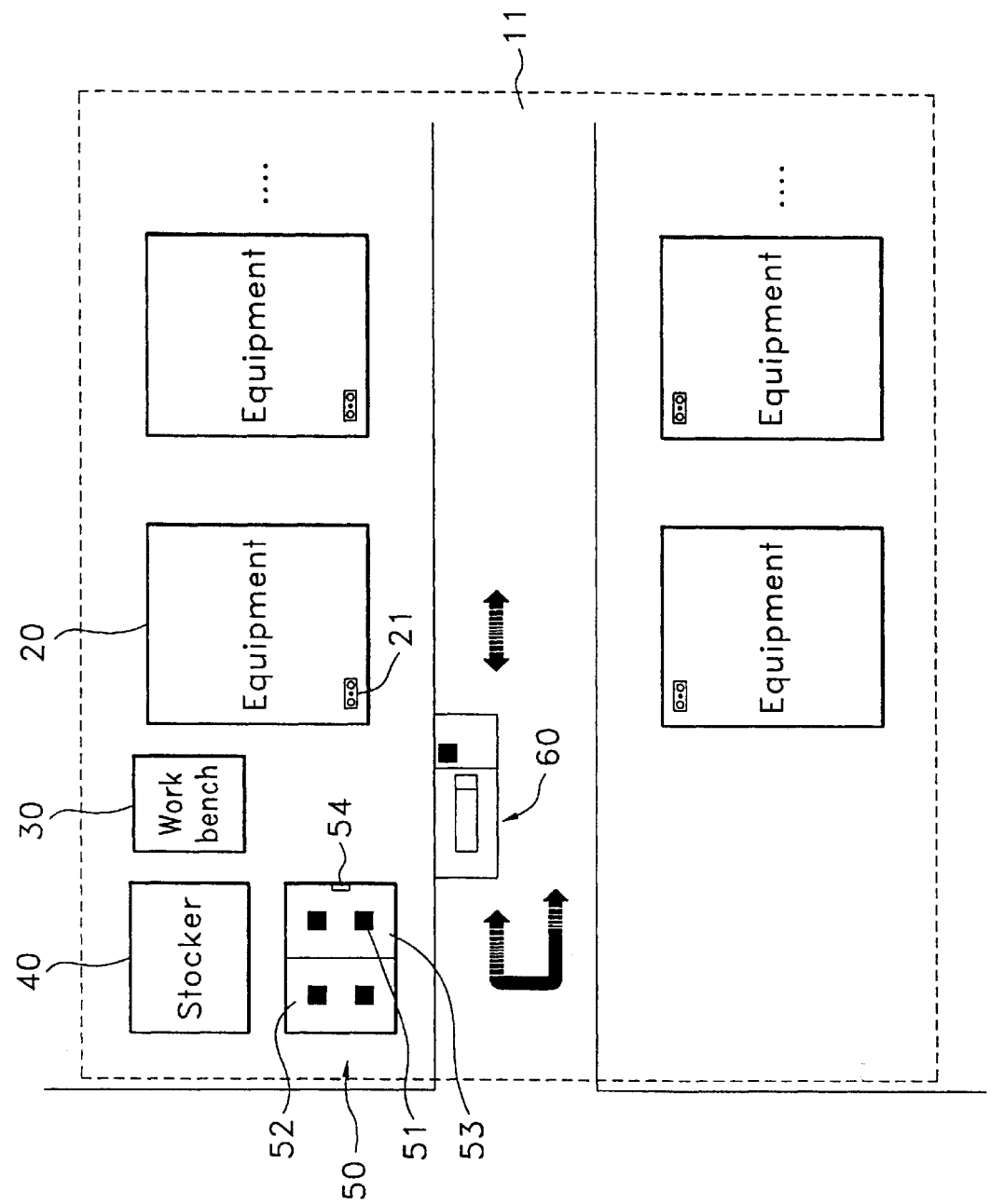
FIG. 1 is a schematic block diagram of equipment arranged in a semiconductor fabrication line according to the present invention.

As shown in FIG. 1, processing equipment is arranged at predetermined intervals on both sides of a passage 11 through which a wafer carrier transferring apparatus 60 for transferring wafer carriers 51 travels. The stocker 40, a mechanical interface conveyor (MIC) 50 and a work bench 30 are arranged at one end of the passage 11. In the stocker 40, a plurality of carrier boxes with the wafer carriers 51 are stored. The wafer carriers 51 wait temporarily on the MIC 50 before and after being transferred to the stocker 40 and the waiting state of the wafer carriers 51 is recognized by the MIC 50. Operators put the carrier boxes on the work bench 30 and take the wafer carrier 51 out of the carrier box.

The MIC 50 comprises an outlet port 53 in which the wafer carrier 51 carried out from the stocker 40 is held before being loaded onto the transferring apparatus 60, and an inlet port 52 in which the wafer carrier 51 unloaded from the wafer carrier transferring apparatus 60 is held before being carried into the stocker 40. Generally, the inlet and outlet ports 52 and 53 are comprised of conveyor belts. In addition, a bar code recognition unit 54 is installed in the outlet port 53, for recognizing identification information in the bar code on the wafer carrier 51 that is waiting to be loaded onto the transferring apparatus 60. A vision mark 21 for position correction including three circular marks having predetermined diameters is formed on the processing equipment 20.

Figure 2:
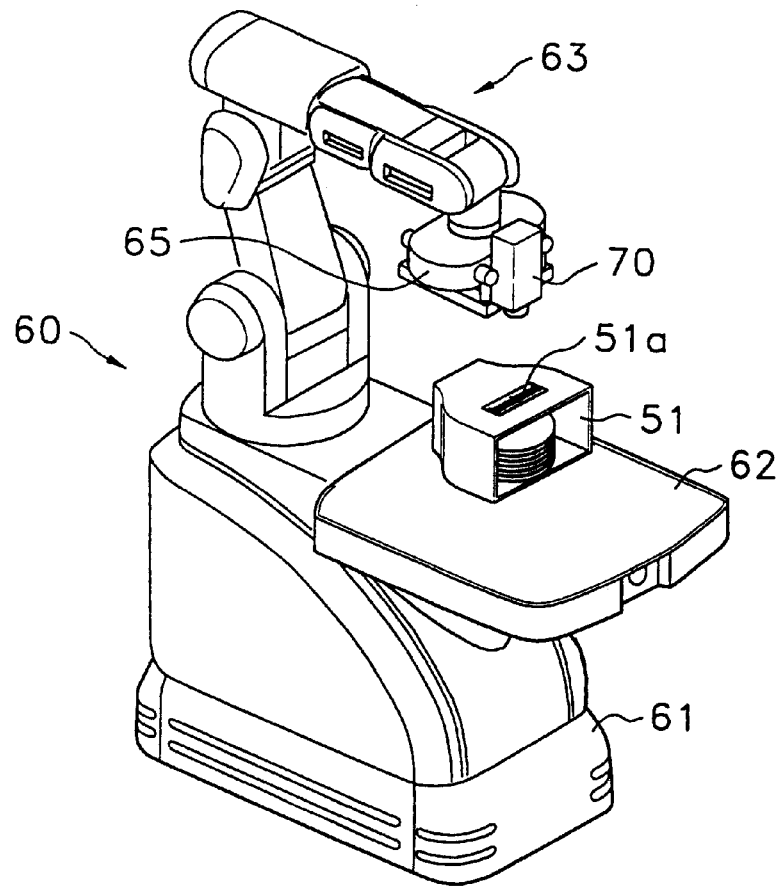
FIG. 2 is a perspective view of an embodiment of an apparatus for transferring a material loader according to the present invention.
Figure 3:
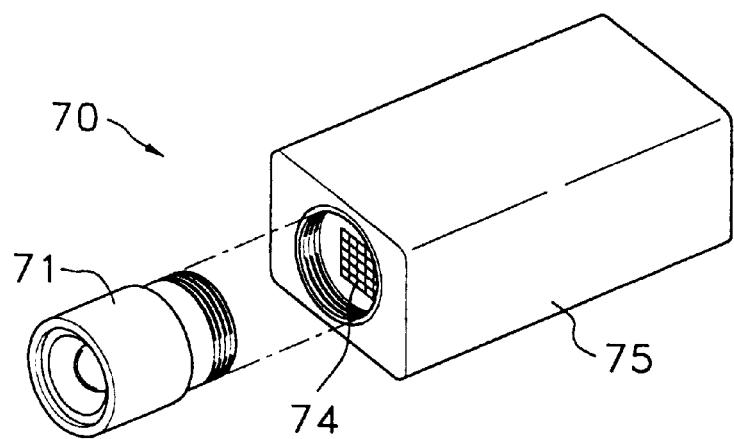
FIG. 3 is an exploded perspective view of an embodiment of an image recognition unit according to the present invention.

Referring to FIGS. 1 through 3, the method and apparatus for transferring wafer carriers according to the present invention will be described in detail hereinafter.

As shown in FIG. 2, the wafer carrier transferring apparatus 60 according to the present invention comprises: a support 62 for loading a wafer carrier 51 thereon; a robot arm 63 for unloading the wafer carrier 51 from the support 62 and onto the processing equipment 20 or the inlet port 52 of the MIC 50, or unloading the wafer carrier 51 from the processing equipment 20 or the outlet port 53 of the MIC 50 and onto the support 62; a conveying unit 61 supporting the support 62 in the robot arm 63 and moving the entire apparatus back and forth along the passage 11; and a CCD camera 70 for recognizing both a vision mark for correcting the position of the robot arm 63 and a bar code of the wafer carrier 51.

The CCD camera 70 is installed on the front surface of a holding member 65 of the robot arm 63 for holding the wafer carrier 51. The lens of the CCD camera 70 is directed toward the support 62.

Referring to FIG. 3, the CCD camera 70 comprises: a lens 71 having a focal length that allows the camera to focus on a bar code 51a of the wafer carrier 51 and on a vision mark 21 for position correction on the processing equipment 20; a CCD sensor 74 for outputting an image signal corresponding to the amount of the light incident from the lens 71; and a housing 75 which the lens is detachably coupled with and in which the CCD sensor 74 is installed.

It is important to select an appropriate lens 71 in order for the CCD camera 70 to focus on the bar code 51a of the wafer carrier 51 and the vision mark 21 on the processing equipment 20. The selection of the lens 71 can be carried out two ways. One way is to select a lens 71 capable of accurately recognizing the bar code 51a, and then adjust the size of the vision mark 21 according to the selected lens 71. The other way is to select a lens 71 suitable for the vision mark 21, and then adjust the shape of the bar code 51a according to the selected lens 71. Actually, it is difficult to change the shape of the bar code 51a. Accordingly, the present invention will be described by means of an example of the first way of selecting a lens 71 capable of accurately recognizing the bar code 51a, and then adjusting the size of the vision mark 21 according to the selected lens 71.

A conventional CCD camera can photograph a vision mark 21 from a distance of 250 mm using a lens 71 having a focal length of 12 mm and a half. Inch CCD sensor 74. Such a camera has a field of view (FOV) having a width of approximately 110 mm. This means that the camera can clearly see the vision mark in an area having a width of 110 mm when the CCD camera focuses on the vision mark 21 with the 12 mm lens at a distance of 250 mm.

However, the 12 mm focal length and 110 mm wide FOV of the lens included in the conventional CCD camera 70 cannot accurately focus on the bar code 51a which has a width of 32 mm.

Accordingly, a lens that can accurately recognize the bar code 51a as well will be selected. As a condition for selecting a lens 71 capable of accurately recognizing the bar code 51a, the operation distance is 250 mm and the bar code 51a has a width of 32 mm and 400 pixels. Accordingly, the FOV is determined to be 52 mm. Therefore, a lens having a focal length of 25 mm is selected.

Figure 5:
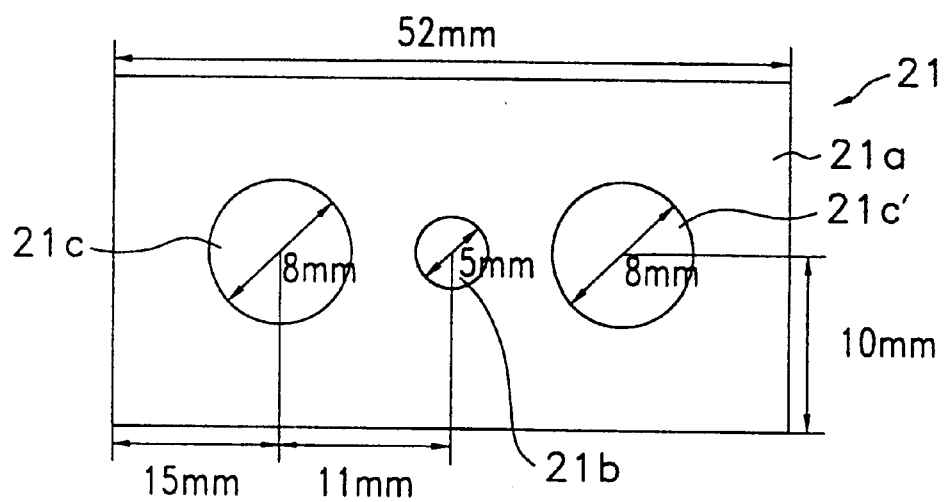
FIG. 5 is a top view of an embodiment of a vision mark for position correction according to the present invention.

In addition, the vision mark is changed so as to satisfy the 52 mm FOV of the selected lens 71. Referring to FIG. 5, the vision mark 21 includes three circular marks 21b, 21c and 21c' formed on a rectangular pad 21a at uniform intervals. To satisfy the 52 mm FOV of the lens 71, the pad 21a has a width of 52 mm, the central circular mark 21b has a diameter of 5 mm, and the circular marks 21c and 21c' each have a diameter of 8 mm.

The method for transferring wafer carriers using the wafer carrier transferring apparatus will be described hereinafter. First, the operator carries the carrier box out of the stocker 40 and places the carrier box on the work bench 30. Then, the operator removes the wafer carrier 51 from the carrier box, attaches a bar code 51a onto the wafer carrier 51 and places the wafer carrier 51 in the outlet port 53 of the MIC 50.

The wafer carrier 51 placed in the outlet port 53 is moved toward the passage 11 by a conveyor installed under the outlet port 53. During the movement, the bar code reader 54 that is a bar code recognition device reads the bar code 51a attached to the wafer carrier 51. Then, the bar code information is transmitted to and saved in the host computer.

Thereafter, the wafer carrier transferring apparatus 60 receives a command from the host computer to transfer the wafer carrier 51 and then approaches the MIC 50 through the passage 11. Then, the holding member 65 of the robot arm 63 holds the wafer carrier 51 and loads the wafer carrier 51 onto the support 62. Thereafter, the wafer carrier 51 loaded on the support 62 is moved toward the processing equipment 20 along a preset conveying line by the wafer carrier transferring apparatus 60.

When the wafer carrier transferring apparatus 60 arrives in front of the processing equipment 20, the robot arm 63 moves the CCD camera 70 to a position at which the focusing distance to the bar code 51a attached to the upper surface of the wafer carrier 51 is approximately 250 mm.

Figure 6:
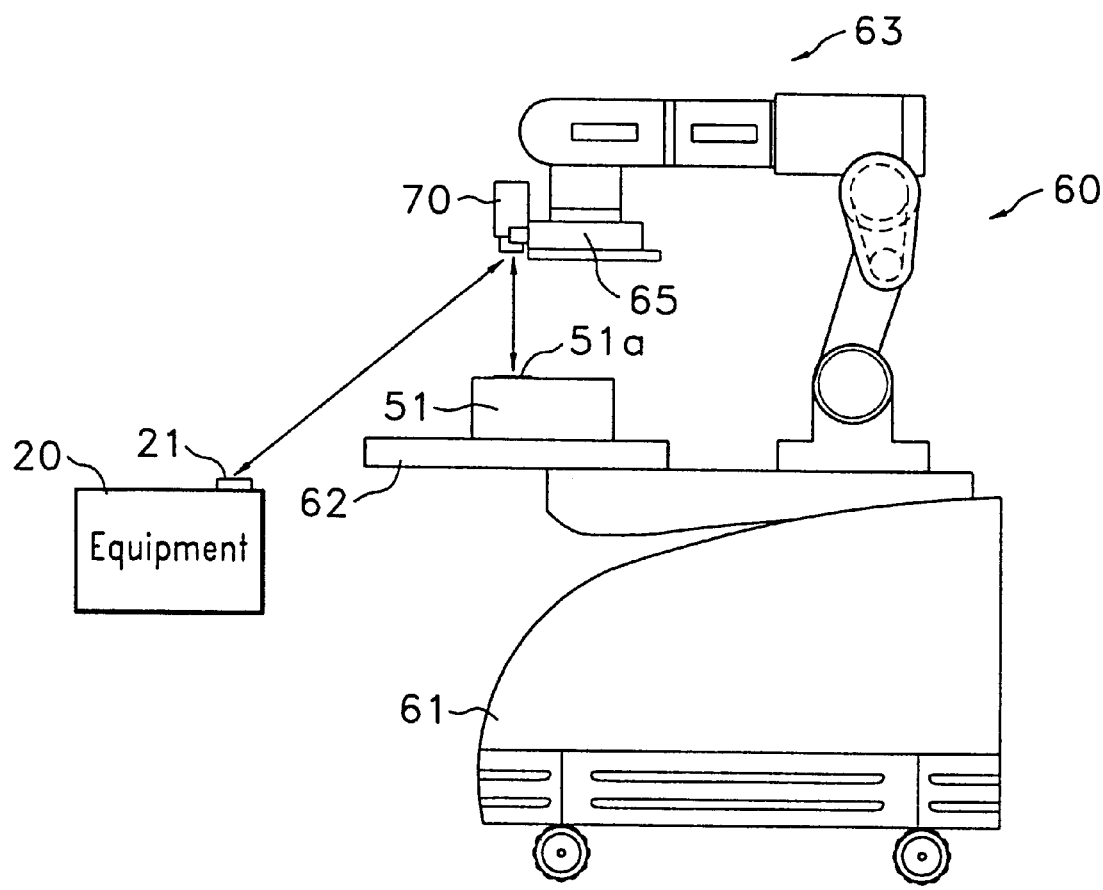
FIG. 6 is a side view of the apparatus of FIG. 2 during the focusing process of the image recognition unit.

As shown in FIG. 6, the CCD camera 70 focuses on the bar code 51a of the wafer carrier 51 and transmits an image signal corresponding to the bar code 51a to the host computer. Then, the host computer compares the bar code information corresponding to the image signal with the bar code information read by the bar code reader 54 while the wafer carrier was moving within the outlet port 53, and determines whether or not the two wafer carriers 51 from which the respective bar code information has been read are the same. If it is determined that the two wafer carriers 51 are the same, the host computer commands the wafer carrier transferring apparatus 60 to load the wafer carrier 51 onto the processing equipment 20.

According to the loading command from the host computer, the robot arm 63 moves the CCD camera 70 to a position at which the focusing distance to the vision mark 21 located on a predetermined area of the processing equipment 20 is approximately 250 mm.

The CCD camera 70 focuses on the vision mark 21 and transmits actual coordinate values of the vision mark 21 to a controlling portion of the wafer carrier transferring apparatus 60. The controlling portion compares the transmitted actual coordinate values with preset reference coordinate values and calculates an error value. According to the error value, the wafer carrier loading position of the robot arm 63 is corrected.

Thereafter, the holding member 65 of the robot arm 63 holds the wafer carrier 51 and loads the wafer carrier 51 at the corrected position onto the processing equipment. Thereafter, a predetermined process is performed by the processing equipment 20.

As aforementioned, the present invention is capable of reducing the cost which would otherwise be incurred and maintaining the productivity which would be lost by installation of bar code recognition devices on each piece of processing equipment, by recognizing both the vision mark on the processing equipment and the bar code of the wafer carrier using the CCD camera installed in the wafer carrier transferring apparatus, instead of using a CCD camera and a bar code reader for recognizing the vision mark and the bar code separately.

Figure 4:
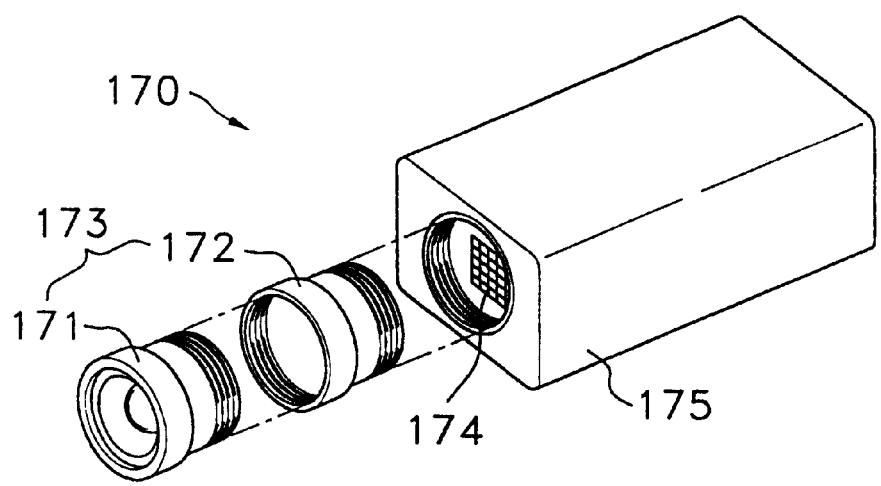
FIG. 4 is an exploded perspective view of another embodiment of an image recognition unit according to the present invention.

A second embodiment of the CCD camera 70 according to the present invention, as shown in FIG. 4, further includes an extension ring 172 between the lens 171 and the housing 175 for more accurate adjustment of the focal length of the lens 171.

Though a lens having a focal distance of 25 mm is selected for the CCD camera 70 in the first embodiment, a desirable focal distance under the condition that the operation distance is 250 mm and the FOV is 52 mm is actually 27.4 mm when the focal length is more accurately calculated. However, lenses commercially available are limited to certain specific focal lengths. Accordingly, a lens having a focal length of 25 mm is selected as being the closest to the 27.4 mm accurately calculated focal length value.

Accordingly, in order to obtain the same efficiency from the 25 mmf lens as from a 27.4 mmf lens, an extension ring 172 is coupled with the housing 175. The dimensions of the extension ring 172 are selected such that an effective focal length of a 25 mm lens is increased by 3 mm when the extension ring is used with the lens.

When the CCD camera 170 focuses on the bar code 51a and the vision mark 21 using the extension ring 172, the FOV has a width of approximately 55 mm when the operation distance is 200 mm, and the FOV has a width of 66 mm when the operation distance is 250 mm. This means that an area having a width of 55 mm is clearly visible when the bar code 51a and the vision mark 21 are focused on through the 25 mmf lens 171 from a distance of 200 mm, and an area having a width of 66 mm is clearly visible at 250 mm distance.

As aforementioned, the CCD camera further including the extension ring is capable of more accurately adjusting the focal length of the lens and thereby more accurately recognizing the bar code and the vision mark.

This invention has been described above with the transferring apparatus for transferring wafer carriers. It is evident, however, that the present invention can be modified for other transferring apparatuses including an image recognizing unit to be used in a semiconductor fabrication line. In addition, the image recognition unit is described above with a CCD camera. It is also evident, however, that other devices can be used as the image recognition unit.

In addition, in the present invention, the lens capable of accurately recognizing the bar code is selected first, and then the size of the vision mark is adjusted. However, it is also possible to select a suitable lens for the vision mark and adjust the shape of the bar code.

As aforementioned, according to the present invention, both the bar code of the wafer carrier and the vision mark for position correction can be recognized by changing the lens of the image recognizing unit installed in the wafer carrier transferring apparatus for transferring wafer carriers and the vision mark attached to the processing equipment. Accordingly, a separate bar code reader for recognizing the bar code is not required. This results in reduced installation cost. In addition, the processing equipment need not be stopped to install a bar code reader. This results in enhanced productivity.

This invention has been described above with reference to the aforementioned embodiments. It is evident, however, that many alternatives, modifications and variations will be apparent to those having skill in the art in light of the foregoing description. Accordingly, the present invention embraces all such alternatives, modifications and variations as fall within the spirit and scope of the appended claims.

What is claimed is:

1. An apparatus for transferring a material loader comprising:
    a supporting member onto which said material loader is loaded;
    a robot arm that unloads said material loader from said supporting member and loads said material loader onto a processing equipment, and that unloads said material loader from said processing equipment and loads said material loader onto said supporting member;
    a conveying unit that supports and moves said supporting member and said robot arm; and
    an image recognition unit, installed on said robot arm, that recognizes both a bar code attached to said material loader and a vision mark for position correction installed on said processing equipment.

2. The apparatus according to claim 1, wherein said image recognition unit is a CCD camera.

3. The apparatus according to claim 2, wherein said CCD camera comprises:
    a lens having a focal length that allows said CCD camera to focus on said bar code and said vision mark;
    a CCD sensor that outputs an image signal corresponding to an amount of light incident from said lens; and
    a housing to which said lens is detachably coupled and in which said CCD sensor is installed.

4. The apparatus according to claim 3, wherein said lens has a focal length of 25 mm, and at an operation distance of 250 mm said lens has a field of view of 52 mm.

5. The apparatus according to claim 4, wherein said vision mark has a width of 52 mm.

6. The apparatus according to claim 3, wherein said CCD camera further comprises an extension ring coupled with said lens that adjusts said focal length of said lens.

7. The apparatus according to claim 6, wherein said lens has a focal length of 25 mm, and dimensions of said extension ring are selected so as to increase an effective focal length of said lens by 3 mm when said extension ring is used with said lens, whereby said lens with said extension ring at an operation distance of 250 mm has a field of view of 66 mm.

8. The apparatus according to claim 6, wherein said lens has a focal length of 25 mm, and dimensions of said extension ring are selected so as to increase an effective focal length of said lens by 3 mm when said extension ring is used with said lens, whereby said lens with said extension ring at an operation distance of 200 mm has a field of view of 55 mm.

9. The apparatus according to claim 1, wherein said material loader is a wafer carrier.

10. A method for transferring a wafer carrier comprising:
    reading bar code information from a bar code of said wafer carrier a first time and transmitting said bar code information to a host computer;
    moving said wafer carrier to a relevant processing equipment;
    reading said bar code information from said bar code a second time and transmitting said bar code information to said host computer;
    determining whether said bar code information read the first time is the same as said second bar code information read the second time;
    if it is determined that said bar code information read the first and second times are the same, recognizing a vision mark for position correction located on said processing equipment to correct a loading position of said wafer carrier; and
    loading said wafer carrier into said processing equipment at said corrected loading position.

11. The method according to claim 10, wherein said reading of said bar code information the first time is performed by a bar code reader, and both said reading of said bar code information the second time and said recognizing of said vision mark are performed by an image recognition device.

12. The method according to claim 11, wherein said moving of said wafer carrier to the relevant processing equipment is performed by a wafer carrier transferring apparatus, and said image recognition device is located on said wafer carrier transferring apparatus.

13. The method according to claim 11, wherein said image recognition device is a CCD camera, and said recognizing of said vision mark is performed by positioning said CCD camera a predetermined distance from said vision mark, detecting actual coordinate values of said vision mark, and calculating an error value by comparing said detected actual coordinate values with reference values, wherein said predetermined distance is 250 mm, a lens of said CCD camera has a focal length of 25 mm, and said vision mark has a width of 52 mm.

14. An apparatus for transferring a wafer carrier comprising:
    a supporting member onto which said wafer carrier is loaded;
    a robot arm that unloads said wafer carrier from said supporting member and loads said wafer carrier onto a processing equipment, and that unloads said wafer carrier from said processing equipment and loads said wafer carrier onto said supporting member;
    a conveying unit that supports and moves said supporting member and said robot arm; and
    a CCD camera, installed on said robot arm, that recognizes both a bar code attached to said wafer carrier and a vision mark for position correction installed on said processing equipment, wherein said CCD camera comprises
- a lens having a focal length that allows said CCD camera to focus on said bar code and said vision mark,
- a CCD sensor that outputs an image signal corresponding to an amount of light incident from said lens, and
- a housing to which said lens is detachably coupled and in which said CCD sensor is installed, said lens having a focal length of 25 mm and said vision mark having a width of 52 mm, such that at an operation distance of 250 mm said lens has a field of view of 52 mm.

15. The apparatus according to claim 14, wherein said CCD camera further comprises an extension ring coupled with said lens that minutely adjusts an effective focal length of said lens.

* * * * *